Patented Jan. 4, 1944

2,338,176

UNITED STATES PATENT OFFICE 2,338,176

GLASS MARKING COMPOSITION

Werner F. Goepfert, Weehawken, N. J., assignor to Interchemical Corporation, New York, N. Y., a corporation of Ohio No Drawing. Application May 13, 1941,
Serial No. 393,183

3 Claims. (Cl. 106—19)

This invention concerns glass-marking pencils, and describes a composition especially suitable for the marking of wet, dirty, or other difficultly markable surfaces.

Most glass-marking pencils are essentially colored waxes, or combinations of waxes, with pigments and dyestuffs. They leave good markings on dry glass, but because of their essentially waxy nature, do not adhere well to wet surfaces.

I have discovered that very much improved glass marking compositions can be prepared, which write very well even on wet glass, by incorporating into the composition from about 14% to 20% of a waxy higher fatty acid amide, containing from about 12 to 20 carbon atoms, which gives the composition the ability to stick to wet glass. Because of the nature of these amides, it is necessary to include in the composition a small percentage of a resin, from about 4% to 10%, in order to get the correct glass-marking characteristics. The balance of the composition includes 15% to 25% of hard wax, 20% to 30% of soft oily or waxy material, and the balance pigment, filler, dyestuff and dispersing agents.

A typical composition comprises the following:

| | Percent |
|---|---|
| Carnauba wax | 19.3 |
| Candelilla wax | 3.4 |
| Staybellite resin (hydrogenated rosin) | 6.3 |
| Acrawax B (octa-decylic acid amide) | 14.6 |
| Copper oleate | .8 |
| Black lake | 14.2 |
| Carbon black | 8.4 |
| Methyl violet dyestuff | 2.5 |
| Victoria blue dyestuff | 3.3 |
| Lanoline | 11.8 |
| Lard oil | 15.4 |
| | 100.0 |

The hard wax (carnauba, candelilla, reed, ouricury or other vegetable wax of similar hardness) is used for its physical properties, and because of the excellent solvent action these waxes have on the dyestuffs used. The wax may be a single hard vegetable wax, or a mixture, and may comprise from 15% to 25% of the composition.

The hydrogenated rosin is used in conjunction with the acid amide, to produce the desirable glass-marking properties. It may comprise from about 4% to 10% of the composition. The hydrogenated rosin may be replaced by other resins compatible with the amide—e. g., by ordinary rosin, etc.—but I prefer this particular resin because it retains its properties on prolonged storage and exposure to the air.

The acid amide may be any of those prepared from non-drying fatty acids having from 14 to 20 carbon atoms—it should comprise from about 12% to 20% of the composition. The copper oleate is used as a dispersing agent for pigment and dyestuff. The various pigments and dyes may be varied at will, to give the desired color; but the dyestuff should be soluble in the waxy vehicle for maximum strength.

The lanoline and lard oil may be replaced by other greases and oily diluents. Petrolatum, mineral oil, and similar greasy and oily softeners may be used. These combined softening agents should be 20% to 28% of the composition, using somewhat more oil than grease.

I claim:

1. A glass-marking pencil consisting of from 14% to 20% of an amide of a non-drying fatty acid having from 12 to 20 carbon atoms, from 4% to 10% of a resin compatible therewith, from 15% to 25% of a hard vegetable wax, from 20% to 28% of a softener mixture comprising a major proportion of oil of the class consisting of mineral oil and lard oil, and a minor proportion of a grease of the class consisting of petrolatum and lanoline, and the balance pigment, dyestuff, filler and oil-soluble dispersing agent.

2. A glass-marking pencil consisting of from 14% to 20% of octa-decylic acid amide, 4% to 10% hydrogenated rosin, 15% to 25% of a hard vegetable wax, 20% to 28% of a softener mixture comprising a major proportion of oil of the class consisting of mineral oil and lard oil, and a minor proportion of a grease of the class consisting of petrolatum and lanoline, and the balance pigment, filler, dyestuff and oil-soluble dispersing agent.

3. A glass-marking pencil consisting of about 20% of carnauba wax, about 6% hydrogenated rosin, about 15% octa-decylic acid amide, about 12% lanoline, about 15% lard oil, and the balance principally coloring, oil-soluble dispersing and filling agents.

WERNER F. GOEPFERT.